United States Patent [19]

Battocletti

[11] 4,064,369
[45] Dec. 20, 1977

[54] METHOD AND APPARATUS FOR PATH TESTING IN A TIME DIVISION MULTIPLEX SWITCHING NETWORK

[75] Inventor: Frank E. Battocletti, Columbus, Ohio

[73] Assignee: North Electric Company, Galion, Ohio

[21] Appl. No.: 545,982

[22] Filed: Jan. 31, 1975

[51] Int. Cl.$^2$ .............................................. H04M 3/22
[52] U.S. Cl. ............................ 179/15 BF; 179/175.23
[58] Field of Search ........ 179/15 BF, 15 AT, 175.2 R, 179/175.23

[56] References Cited

U.S. PATENT DOCUMENTS

| 3,641,275 | 2/1972 | Perna et al. | 179/15 BF |
| 3,823,269 | 7/1974 | Saito | 179/15 BF |
| 3,851,122 | 11/1974 | Gibson | 179/175.23 |
| 3,864,523 | 2/1975 | Kellermann | 179/15 BF |

*Primary Examiner*—Douglas W. Olms
*Attorney, Agent, or Firm*—Johnson, Dienner, Emrich & Wagner

[57] ABSTRACT

After marker functions have been performed to set up a network path during normal call processing, a continuity word is inserted into the path. The output of the path is coupled back to the input via a test multiplexer at the input to circulate the continuity word. A word is taken from the path being tested after circulation and is compared to the original continuity word, with identity of comparison being verification of continuity. Continuity test apparatus includes a continuity word register and a comparator. The comparator has inputs from the continuity word register and from the network output for the path being tested. The continuity word may be inserted in the path from an output access memory for maintenance and test words, having its output to the same multiplex lead as the output buffer memory. The continuity word may also be taken from the continuity word register, and from there supplied to a third input of the test multiplexer, and this input is enabled during the time slot of one frame to insert the continuity word. If the network includes access from a controller to input and output buffer memories, the continuity test apparatus may be omitted, and direct reading and writing of the buffer memories used to insert and extract the continuity word from the path being tested, and the comparison is then done in the controller. The test path may also be extended via TDM digital lines to a remote line switch, where the outgoing channel is coupled back to the incoming channel in response to continuity test commands.

23 Claims, 7 Drawing Figures

METHOD AND APPARATUS FOR PATH TESTING IN A TIME DIVISION MULTIPLEX SWITCHING NETWORK

BACKGROUND OF THE INVENTION

This invention relates to a method and apparatus for continuity testing of paths in a time division multiplex switching network.

Communication switching systems require switching networks to selectively interconnect lines to establish paths for calls. There are many types of known switching networks. Most of these switching networks use metallic contacts to close paths between an input terminal and an output terminal. In systems using marker control of crosspoint or crossbar switching networks, it is known for the marker to apply a given potential to one terminal and to test at the other terminal for the presence of this potential, to thereby verify that a continuous path through the network exists for the call.

With the advent of transistors and other solid state switching devices, efforts have been made to provide electronic switching systems using such devices both for control purposes and as the actual switching devices in the network. In time division multiplex switching networks, the signals at incoming terminals of the network are periodically sampled during recurring frames, each terminal being assigned as interval of the frame designated a time slot during which its signal is sampled and transmitted through the switching network to an output terminal. The time slots are thus intervals for carrying signals within each frame. Usually corresponding time slots in each successive frame carry successive portions of a signal; for example, a third time slot of each frame carries successive portions of one signal.

Time division multiplexing principles have also been applied to the transmission of communication signals. One specific application of this principle is known as the T1 carrier system. In that system there are provided 24 channels in corresponding time slots, and the signal is pulse code modulated, providing eight bits which are transmitted for each channel in its time slot during each frame.

Systems are now being developed for switching of the channels from T1 carrier and similar systems directly in the pulse code modulated digital form. If the signals in individual time slots on one line are to be switched to a different line through the network, the lines must be connected only when the time slot carrying a signal for a desired one of the other lines arise at a device connecting the lines. But one example of the many such networks is a network of highways in a time-space-time or TST telephone system.

In a known TST telephone system, call signals from several sources are time division multiplexed into time slots on transmission lines. Several of these multiplex lines are coupled to a time slot interchanger. Each interchanger serves as an input device for one of several input highways of the TST network. Each time slot interchanger has a buffer memory device for receiving the signals from each connected multiplex line and a control memory device for assigning the signals to time slots on the input highway.

Crosspoints connect each input highway to each of several similar output highways. Each output highway then carries signals in time slots synchronized with time slots on the input highway through a highway interchanger. These time slot interchangers serve as output devices for directing the call signals to discrete time slots on multiplex output lines to ultimately reach the call destinations.

To maintain call signal integrity each time slot carries the signal of only one call. It is therefore necessary to select an idle time slot on the input and output highways for each call signal to be added to the highways. The selection of the idle time slot is called an idle path search. A method and apparatus for such an idle path search in a time division multiplexed switching network is disclosed in my application, Ser. No. 428,791 now U.S. Pat. No. 3,912,871 filed Dec. 27, 1973.

The testing of continuity of the call path in a switching network is an important part of system maintenance. A more desirable feature would be to have the continuity test a part of every call processed. This means that prior to establishing a call, the call path to be placed in service is tested for continuity. Such continuity testing is known for space division switching networks, particularly for those having metallic contacts. However, for time division multiplex switching networks, a general procedure is to test the control memories and to assume that the paths are not faulty. In general, path continuity tests are part of a periodic maintenance routine rather than a part of normal call processing. A complete time division network path for a call generally comprises two parts for the two directions of transmission, and both parts should be tested.

SUMMARY OF THE INVENTION

It is an object of this invention to provide a method and apparatus for path continuity testing through a time division multiplex switching network, the testing procedure to be simple enough to be a part of every call process.

According to the invention, there is provided a method and apparatus for path continuity testing in which a continuity word is inserted into one part of the path, the outputs and inputs of the path are coupled to form a loop to circulate the continuity word, and a comparison is made between the original continuity word and the word as detected at a predetermined point of the loop, to supply a verify signal if the two words are identical.

Since signals are transmitted through the switching network in only one direction, each channel terminating the network has both an input appearance on an input side of the network and an output appearance on an output side of the network. In one embodiment of the invention, apparatus is provided comprising a special continuity test multiplex circuit at the input of the network for each of several switching groups, each such multiplexer having two inputs, the first for normal data input, the second for coupling the network output of that switching group back to its own input. A continuity test circuit includes a comparator which is coupled to the path, for example at the output of the switching group. To make the continuity test, the output of one of the switching groups involved in a call inserts a special continuity word, which is then transmitted via the multiplexer for the group to the input, through the network to the other switching group output, coupled from the output back through the multiplexer for that switching group to its input, transmitted through the network from that input to the output for the first switching group, and then coupled to the continuity test multiplexer at the input of the first switching group to form the circulating loop. The signals from the output of the first group are then coupled to a comparison circuit. The comparison circuit has another input from a register storing the continuity word, and if the words supplied at the two inputs are the same, a verify signal is supplied at the output.

In other embodiments of the invention, the continuity word is inserted by a special circuit through a third input to the multiplexer, or into a buffer memory for the call directly from a controller. As an alternative form of comparison, one buffer memory in the path is read at an appropriate time to obtain the word for comparison with the original continuity word. In another embodiment of the invention instead of using a continuity test multiplexer, the continuity test path may be extended via the T1 lines and the line switch, with special commands sent to couple the received signal back to the sending path to thereby recirculate the continuity word.

DESCRIPTION OF PREFERRED EMBODIMENT

Figure 1:
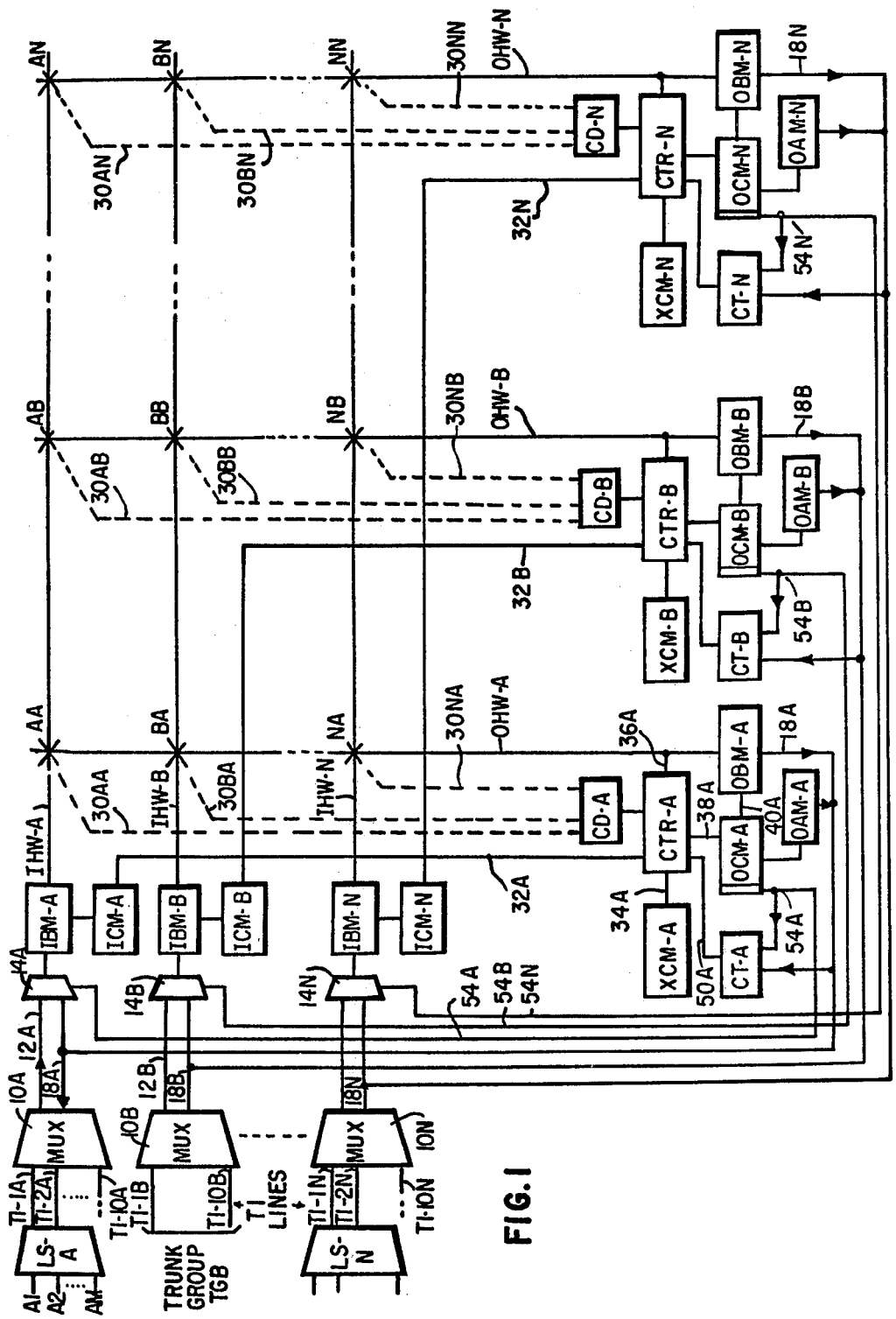
FIG. 1 is a block diagram of a telephone switching system.

FIG. 1 illustrates a communication switching system, more particularly a pulse code modulation time division multiplexed telephone system, including the preferred embodiment of the invention. The following table (Table 1) contains a list of descriptive device names corresponding to the device abbreviations shown in the boxes of FIG. 1 and all succeeding figures employing the abbreviations.

TABLE 1

LS — Line Switch
MUX — Multiplexer
IBM — Input Buffer Memory
ICM — Input Control Memory
CD — Crosspoint Decoder
XCM — Crosspoint Circuit Memory
CTR — Controller
CT — Continuity Test Circuit
OCM — Output Control Memory
OBM — Output Buffer Memory
OAM — Output Access Memory A digital switching matrix is a time-space-time (TST) connecting network. The first and last digits are realized by full-availability time slot interchangers (TSI). The center stage is a time-division space stage. The square array of crosspoints is partitioned into vertical columns of N × 1 crosspoints, N being the number of superhighways of the network. The matrix is divided into switch groups on a superhighway basis, with each switch group having its own controller. For example, switch group A comprises an input time slot interchanger comprising an input time slot interchanger comprising an input buffer memory IBM-A connected to superhighway IHW-A and a control memory ICM-A; an output time slot interchanger comprising an output buffer memory OBM-A, an output access memory OAM-A and a control memory OCM-A. Switch group A also includes the vertical column of crosspoints AA, BA to NA inclusive with inputs from the superhighways of the several switch groups, and an output to the output buffer memory OBM-A. The output access memory OAM-A is provided to permit the insertion of call process and maintenance signals into the output. Examples of such signals are the continuity test words. These words are read from the access memory OAM-A when addressed from the contents of the control memory OCM-A. The switch group A has its own individual controller CTR-A. The crosspoints have an associated control memory XCM-A, and a crosspoint decoder CD-A. The decoder CD-A enables the crosspoints in selected time slots via the lines 30AA, 30BA to 30NA inclusive. Similarly switch group B comprises an input time slot interchanger with memories IBM-B and ICM-B, a vertical column of crosspoints AB, BB, to NB inclusive, and an output time slot interchanger comprising memories OBM-B, OAM-B, and OCM-B, along with its controller CTR-B, a crosspoint control memory XCM-B and a crosspoint decoder CD-B. The other switch groups are similarly organized up to and including switch group N. Each switch group also includes address counters (not shown) for the input and output time slot interchangers.

Each switching group has a multiplexer shown as 10A for Group A, and 10B to 10N for the other groups. It might, for example, combine the channels from ten T1 line T1-1 to T1-10, each of these T1 lines having an incoming pair and an outgoing pair as shown. Each of the T1 lines multiplexes twenty-four channels, making a total of 240 channels served by a switch group.

CONTINUITY TEST APPARATUS

The equipment added to the system for continuity testing consists of a two-input multiplexer 14A for Group A, 14B for Group B and so forth to 14N for Group N at the input of each input buffer memory, an additional output control memory bit, and a continuity testing circuit CT for each group. The same equipment is added for each switching group, for example continuity test circuit CT-A for Group A, CT-B for Group B, and so forth to CT-N for Group N. No interconnection is required between switching groups other than what is provided already.

Figure 2:
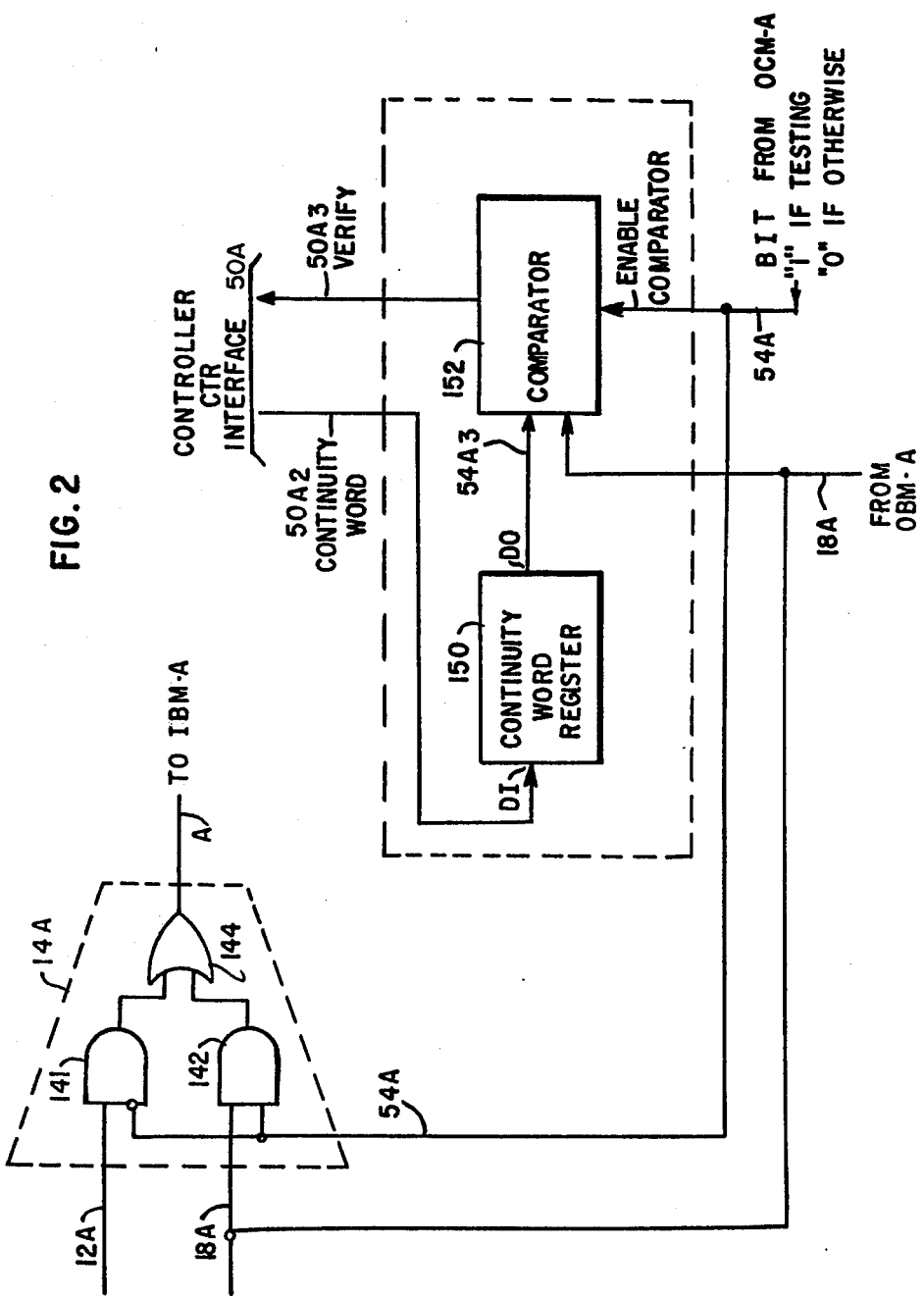
FIG. 2 is a functional block diagram of apparatus for continuity testing.

The details of a multiplexer and a continuity test circuit for Group A are shown in FIG. 2. The continuity test circuit consists of a register 150 to store the continuity word used for testing and a comparator 152 to compare the word before and after it has passed through the network. If a path is continuous then the comparator presents a "1" to the controller CTR-A verifying the test to be acceptable. It should be noted that the interface between the CTR and the continuity test circuits is represented in FIGS. 1, 3, 4, and 5 as interface 50A. The interface comprises more than one physical wire as described hereinafter with reference to FIGS. 2 and 4. Each wire within the interface will be labeled lead "50AX" where X is a positive integer.

The inputs to the continuity test circuits are:
1. the continuity word from the controller via lead 50A2,
2. the data from the output buffer memory via lead 18A, 3. a test bit stored in the output control memory OCM-A supplied via lead 54A.

The outputs of the continuity test circuit are a verify output to the controller from the comparator via lead 50A3.

The address for the two-input multiplexer comes from the output control memory OCM-A from lead 54A. It is a "0" when data from the multiplexer 10A is to be sent to the input buffer memory IBM-A. The bit is a "1" when the data from the output buffer memory is to be sent to the input buffer memory.

The continuity word register 150 has an input port D1 for serially loading the continuity word from the controller via lead 50A2, and an output port DO for supplying the continuity word via lead 54A3 to the comparator. The comparator 152 has two inputs, one from the continuity register, as already mentioned, and one from the output buffer memory via lead 18A. The comparator is operative to compare the words received via its two inputs and if they are the same to supply a verify signal via its output to lead 50A3 to the controller.

The continuity test multiplexer 14A is shown in FIG. 2 as comprising two AND gate 141 and 142 corresponding to the two inputs, the outputs of the AND gates being combined via on OR gate 144 to the output lead 16A. When the address on lead 54A is 0, gate 141 is enabled to supply the principal data from the group multiplexer 10A to the input buffer memory. When the address is 1, gate 142 is enabled to couple the output of the group from the output buffer memory OBM-A via lead 18A back into the input buffer memory IBM-A via lead 16A.

OPERATION FOR CONTINUITY TEST

To explain the operation of the continuity test procedure, assume that a call is originated by a calling party on line A1 of line switch LS-A, and that the call becomes routed outgoing on a channel of line T1-1B of switch Group B. Prior to making the continuity test, marker functions are performed for a call. Initially the controller CTR-A causes scanning for idle lines to be done by one of the idle channels, for example of line T1-1A. When line A1 is scanned the calling condition is found, and that line becomes attached to say channel 1 of line T1-1A. After the called number is dialed, call analysis is accomplished involving the controller CTR-A and the processor, and it is determined that the call is to be routed by say channel 1 of line T1-1B. These follow marker functions which involve the writing of proper addresses in the input control memory ICM-A, the crosspoint control memory XCM-A, the outgoing control memory OCM-A, all in switch Group A; and also in memory ICM-B, memory XCM-B and memory OCM-B of switch group B. When the marker function is performed on memories OCM-A and OCM-B the continuity test bit is made a "1" for each.

The procedure of making a continuity test is best illustrated by reference to FIG. 3, along with FIG. 2. Note that the path for the call through the switching network is extended from line 12A in switch Group A to a word store in the input buffer memory IBM-A, thence via a selected time slot from the buffer memory IBM-A over the superhighway IHW-A through crosspoint AB to a word store in output buffer memory OBM-B, from thence via the lead 18B and the multiplexer 10B to the line T1-B1. There is also a reverse portion of the path established from line T1-1B through the multiplexer 10B and into a word store of the input buffer memory IBM-B, and from there via a selected time slot over the superhighway IHW-B and crosspoint BA to a word store of output buffer memory OBM-A, and from there via lead 18A and multiplexer 10A to the line T1-1A.

After setting up the path for the call and setting the continuity test bits in the memories OCM-A and OCM-B, the procedure for performing the continuity test for the call, referring to points of FIG. 3 numbered in small circles, is as follows:

a. the continuity word which is stored in the access memory OAM-A is also sent from the controller CTR-A to the continuity test circuit CT-A via lead 50A2 and placed via port D1 into the continuity word register 150.

b. the address in control memory OCM-A is temporarily changed to permit the continuity word stored in access memory OAM-A to be sent from memory OAM-A at point 1, and via lead 18A to multiplexer 14A at point 2. This is done at the proper time slot as selected by the address counter, the memory OCM-A has a "1" in the test bit, thus gating the word via multiplexer 14A to point 3.

c. the continuity word is present at the point 3. The word is switched into the input buffer memory IBM-A.

d. The continuity word is stored in the same word store of the memory IBM-A as the data from the multiplex 10A will be when the call is established. At the prescribed time slot the control memories ICM-A and XCM-B gate the words through crosspoint AB to the output buffer memory OBM-B as shown at point 5.

e. the address in the control memory OCM-A is changed to that which causes the proper word to be read from buffer memory OBM-A.

f. at the prescribed time slot the word is read from the output buffer memory OBM-B. The control memory OCM-B has a "1" in the test bit, thus gating the word into the input buffer memory IBM-B via the two input multiplex 14B as shown at points 6 and 7.

g. at the proper time slot the word in the input buffer memory IBM-B is read and gated through crosspoint BA to the input memory OBM-A as indicated at point 8.

h. at the prescribed time slot the word is read from the output buffer memory OBM-A to point 9, and via lead 18A back to point 2. The output control memory OCM-A has a "1" in the test bit thus gating the word via the multiplexer 14A and point 3 into the input buffer memory, IBM-A back to point 4.

Figure 3:
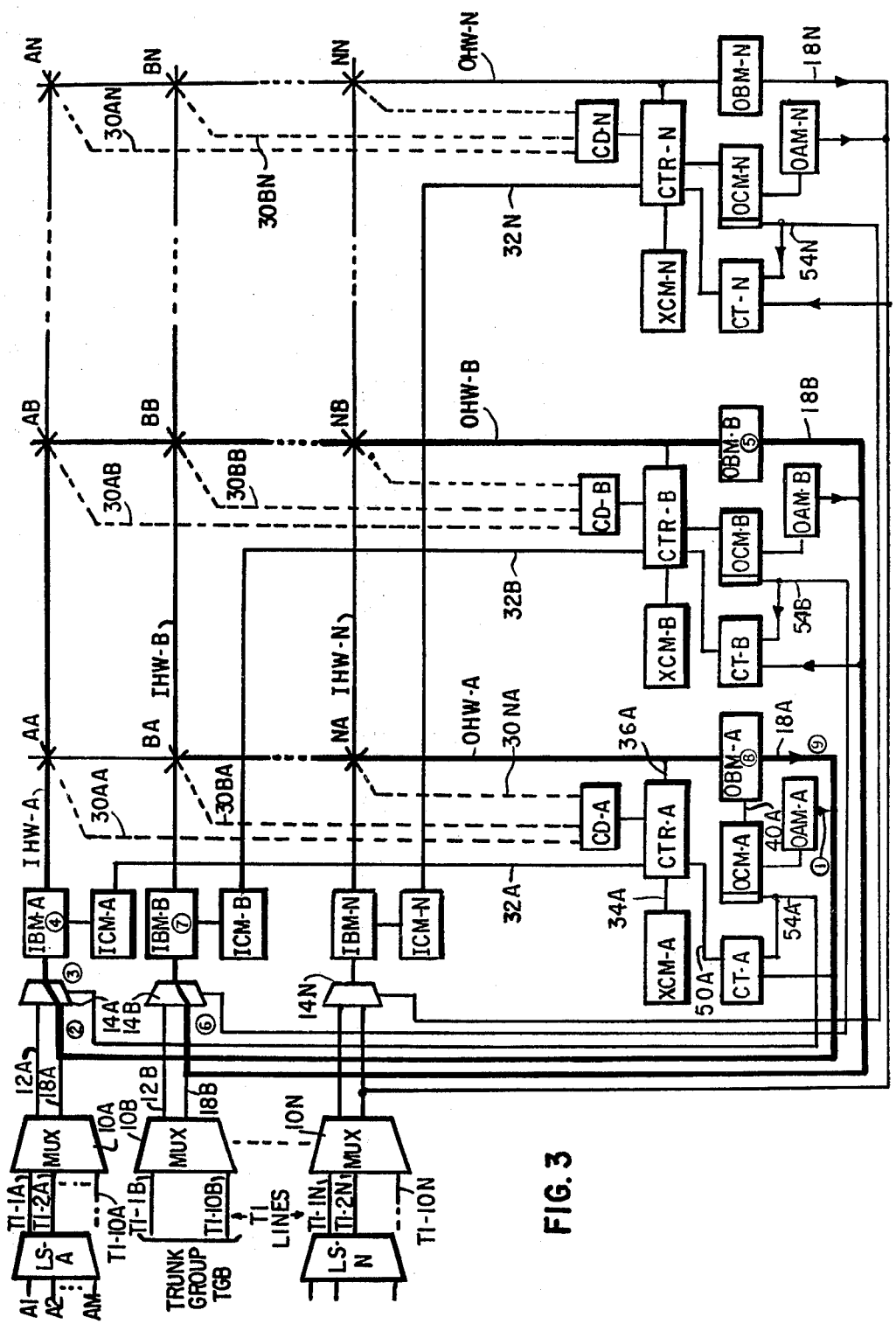
FIG. 3 shows a test path in the system of FIG. 1.

The loop which has been closed is shown in FIG. 3 as a heavy line points 2 – 9 inclusive. After the loop has been closed it continues to circulate the continuity word until the word is changed via controller CTR-A (or CTR-B) or the signal bits are made "0." In this example the continuity test circuit CT-A will produce a vertification of continuity when the continuity word is identical to the output of the output buffer memory OBM-A. The circuitry for the comparison is indicated in FIG. 2 by the comparator 152.

When the controller CTR-A is satisfied that continuity exists for the first continuity word other continuity words can be sent to the continuity test circuit CT-A (or CT-B) and the contents of control memory OCM-A changed temporarily to provide the continuity word from access memory OAM-A to continue the testing. When satisfied that continuity exists a marker function is performed to change the continuity test bit in memories OCM-A and OCM-B to a "0." From then on data will be transferred through the two-input multiplexers 14A and 14B from the multiplexers 10A and 10B.

ALTERNATIVE EMBODIMENT OF CONTINUITY TESTING USING A THREE-INPUT MULTIPLEXER

Instead of using the output access memories OAM-A to OAM-N shown in FIG. 1, the continuity word may be inserted via a three-input multiplexer from the continuity test circuits. Such a system is shown in FIGS. 4 and 5.

CONTINUITY TEST APPARATUS

The equipment added to the system for continuity testing consists of the three-input multiplexer 14A' for Group A, 14B' for Group B and so forth to 14N' for Group N at the input of each input buffer memory, an additional output control memory bit, and a continuity testing circuit CT for each group. The same equipment is added for each switching group, for example continuity test circuit CT-A' for Group A, CT-B' for Group B, and so forth to CT-N' for Group N. No interconnection is required between switching groups other than what is provided already.

Figure 4:
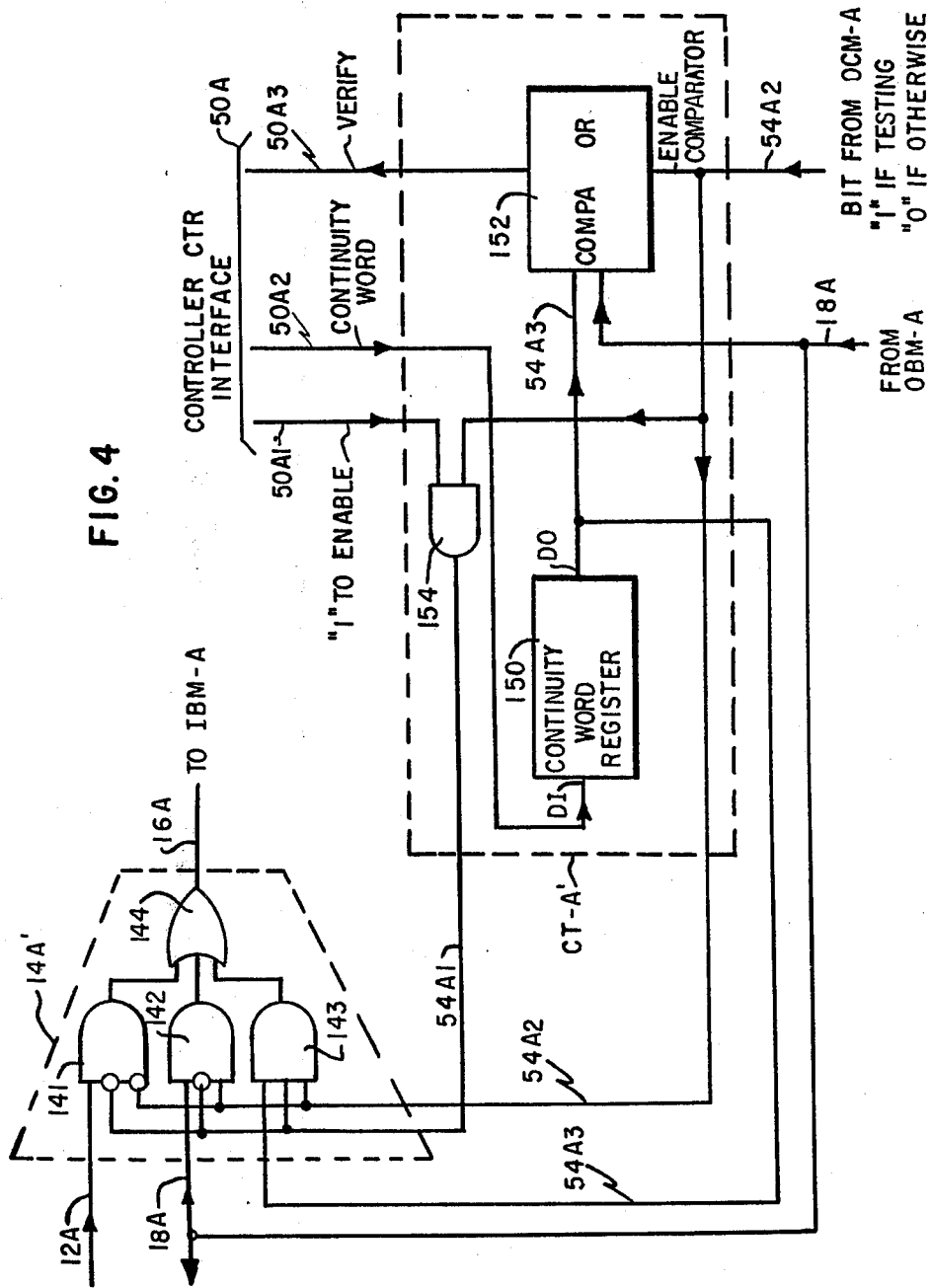
FIG. 4 shows an alternative embodiment for the continuity test apparatus.
Figure 5:
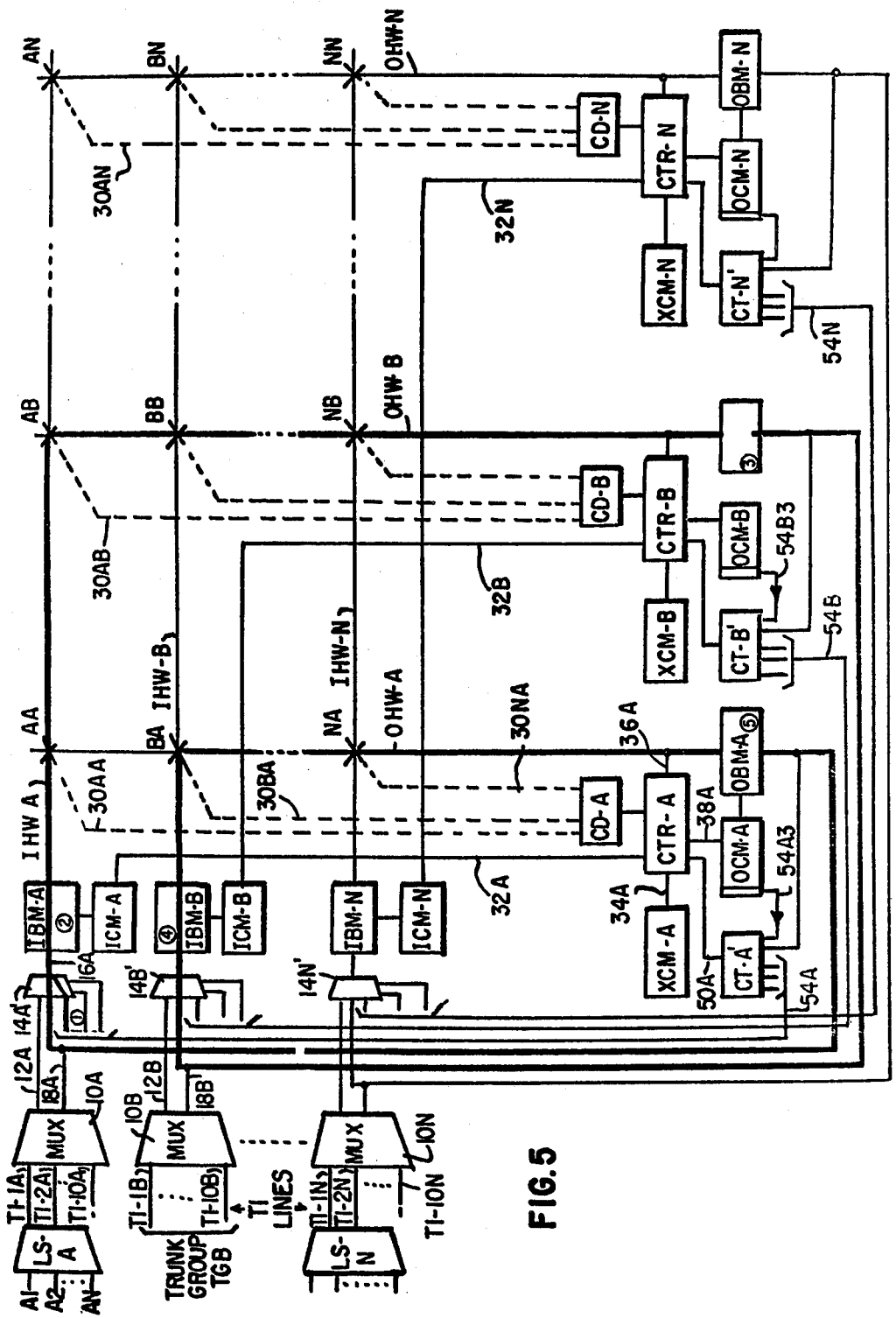
FIG. 5 shows a test path in the system, with the continuity test apparatus of FIG. 4.

The details of a multiplexer and a continuity test circuit for group A are shown in FIG. 4. The continuity test circuit consists of a register 150 to store the continuity word used for testing and a comparator 152 to compare the word before and after it has passed through the network. If a path is continuous then the comparator presents a "1" to the controller CTR-A verifying the test to be acceptable.

The inputs to the continuity test circuit are:
1. the continuity word from the controller via lead 50A2,
2. the data from the output buffer memory via lead 18A,
3. a test bit stored in the output control memory OCM-A supplied via lead 54A2, and
4. a controller enable bit on lead 50A1.

The outputs of the continuity test circuit are:
1. a verify output to the controller from the comparator via lead 50A3,
2. the output of the output buffer memory, on lead 18A, and
3. the continuity word via lead 54A3.

The address for the three-input multiplexer is as follows:
1. the least significant bit comes from the output control memory OCM-A from lead 54A2. It is a "0" when data from the multiplexer 10A is to be sent to the input buffer memory IBM-A. The least significant bit is a "1" when the continuity word or data from the output buffer memory is to be sent to the input buffer memory,
2. the most significant bit of the address is a "1" only when the continuity word is to be sent to the input buffer memory. This is done momentarily to insert the continuity word into the path.

The continuity word register 150 has an input port DI for serially loading the continuity word from the controller via lead 50A2, and an output port DO for applying the continuity word via lead 54A3 to the comparator, and also to the third input of the multiplexer 14A. The comparator 152 has two inputs, one from the continuity register, as already mentioned, and one from the output buffer memory via lead 18A. The comparator is operative to compare the words received via its two inputs and if they are the same to supply a verify signal via its output to lead 58B to the controller. The continuity test circuit also includes an AND gate 154 which is enabled by the bit from the output control memory via lead 54A2 and by the bit on lead 50A1 from the controller to supply the most significant bit of the address of the multiplexer 14A'.

The continuity test multiplexer 14A is shown in FIG. 4 as comprising three AND gates 141, 142, and 143 corresponding to the three inputs, the outputs of the AND gates being combined via an OR gate 144 to the output lead 16A. When the address on leads 54A1 and 54A2 is 00, gate 141 is enabled to supply the principal data from the group multiplexer 10A to the input buffer memory. When the address is 01, gate 142 is enabled to couple the output of the group from the output buffer memory OBM-A via lead 18A back into the input buffer memory IBM-A via lead 16A. When the address is 11, gate 43 is enabled long enough to insert the continuity word from register 150 into the input buffer memory into the appropriate word being used for a call or a path to be tested.

OPERATION FOR CONTINUITY TEST

To explain the operation of the continuity test procedure, assume that a call is originated by a calling party in line A1 of line switch LS-A, and that the call becomes routed outgoing on a channel of line T1-1B of switch Group B. Prior to making the continuity test, marker functions are performed for a call. Initially the controller CTR-A causes scanning for idle lines to be done by one of the idle channels, for example of line T1-1A. When line A1 is scanned the calling condition is found, and that line becomes attached to say channel 1 of line T1-1A. After the called number is dialed, call analysis is accomplished involving the controller CTR-A and the processor PRO, and it is determined that the call is to be routed by say channel 1 of line T1-1B. These follow marker functions which involve the writing of proper addresses in the input control memory ICM-A, the crosspoint control memory XCM-A, the outgoing control memory OCM-A, all in switch Group A; and also in memory ICM-B, memory XCM-B and memory OCM-B of switch group B. When the marker function is performed on memories OCM-A and OCM-B the continuity test bit is made a "1" for each.

The procedure of making a continuity test is best illustrated by reference to FIG. 5, along with FIG. 4. Note that the path for the call through the switching network is extended from line 12A in switch Group A to a word store in the input buffer memory IBM-A, thence via a selected time slot from the buffer memory IBM-A over the superhighway IHW-A through crosspoint AB to a word store in output buffer memory OBM-B, from thence via the lead 18B and the multiplexer 10B to the line T1-1B. There is also a reverse portion of the path established from line T1-1B through the multiplexer 10B and into a word store of the input buffer memoryIBM-B, and from there via a selected time slot over the superhighway IHW-B and crosspoint BA to a word store of output buffer memory OBM-A, and from there via lead 18A and multiplexer 10A to the line T1-1A.

After setting up the path for the call and setting the continuity test bits in the memories OCM-A and OCM-B, the procedure for performing the continuity test for the call is as follows:

a. the continuity word is sent from the controller CTR-A to the continuity test circuit CT-A via lead 50A2 and placed via port DI into the continuity word register 150.

b. an enable signal is sent from the controller CTR-A via lead 50A1 to begin to test. This step effectively makes the most significant bit of the address of the three-input multiplexer 14A' a "1" for the time slot of one frame.

c. the continuity word is present at the point 1 in FIG. 5. The word is switched into the input buffer memory IBM-A at the proper time slot as selected by the address counter. This is indicated at point 2.

d. the continuity word is stored in the same word store of the memory IBM-A as the data from the multiplex 10A will be when the call is established. At the prescribed time slot the control memories ICM-A and XCM-B gate the words through crosspoint AB to the output buffer memory OBM-B as shown at point 3.

e. at the prescribed time slot the word is read from the output buffer memory OBM-B. The control memory OCM-B has a "1" in the test bit, thus gating the word into the input buffer memory IBM-B via the three input multiplex 14B as shown at point 4.

f. at the proper time slot the word in the input buffer memory IBM-B is read and gated through crosspoint BA to the output memory OBM-A as indicated at point 5.

g. at the prescribed time slot the word is read from the output buffer memory OBM-A. The output control memory OCM-A has a "1" in the test bit thus gating the word via the multiplexer 14A into the input buffer memory, IBM-A back to point 2.

The loop which has been closed is shown in FIG. 4 as a heavy line. After the loop has been closed it continues to circulate the continuity word until the word is changed via controller CTR-A (or CTR-B) or the signal bits are made "0." In this example the continuity test circuit CT-A will produce a verification of continuity when the continuity word is identical to the output of the output buffer memory OBM-A. The circuitry for the comparison is indicated in FIG. 4 by the comparator 152.

When the controller CTR-A is satisfied that continuity exists for the first continuity word other continuity words can be sent to the continuity test circuit CT-A (or CT-B) to continue the testing. When satisfied that continuity exists a marker function is performed to change the continuity test bit in memories OCM-A and OCM-B to a "0." From then on data will be transferred through the three-inputs multiplexers 14A and 14B from the multiplexers 10A and 10B.

ALTERNATIVE EMBODIMENT OF CONTINUITY TESTING USING A CONTROLLER BUFFER MEMORY INTERFACE

Figure 6:
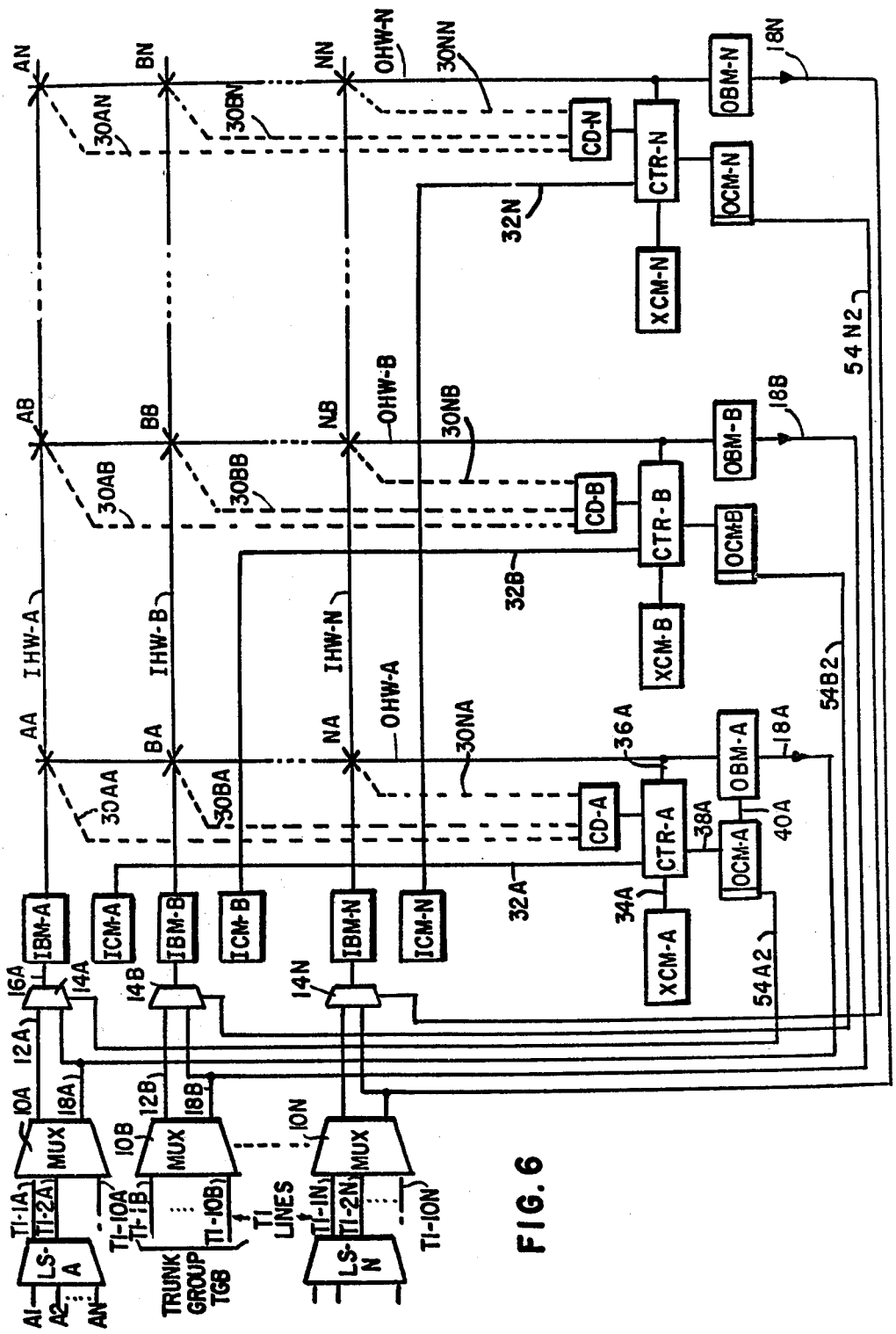
FIGS. 6 and 7 show the system with other embodiments of the invention.

It is possible to reduce the hardware of the continuity test to a two-input multiplexer for each switching group such as 14A, 14B to 14N for the groups A, B to N respectively, and one additional output control memory bit in the output control memory of each group as shown in FIG. 6. The insertion of the continuity word and the comparison test can be implemented by the controller/control memory interface which permits the controller to write selected words in the control memories. If the interface is extended to include buffer memories, then under controller CTR control, the information stored in a register can be written into the buffer memory during the control access cycle of a time slot or during any one of the 16 expansion channels. This feature can be used to insert the continuity word.

In the same interface provision is made for the controller CTR to read the control memories. This means is available for examining the buffer memories for the continuity word after having circulated through the system for a given number of frames.

One form of system organization providing a suitable interface, with a control access circuit for each switching group, is disclosed in a U.S. patent application Ser. No. 533,767 filed Dec. 18, 1974, by F. Fellinger.

ALTERNATIVE EMBODIMENT OF CONTINUITY TEST INCLUDING THE T1 LINE AND LINE SWITCH

Figure 7:
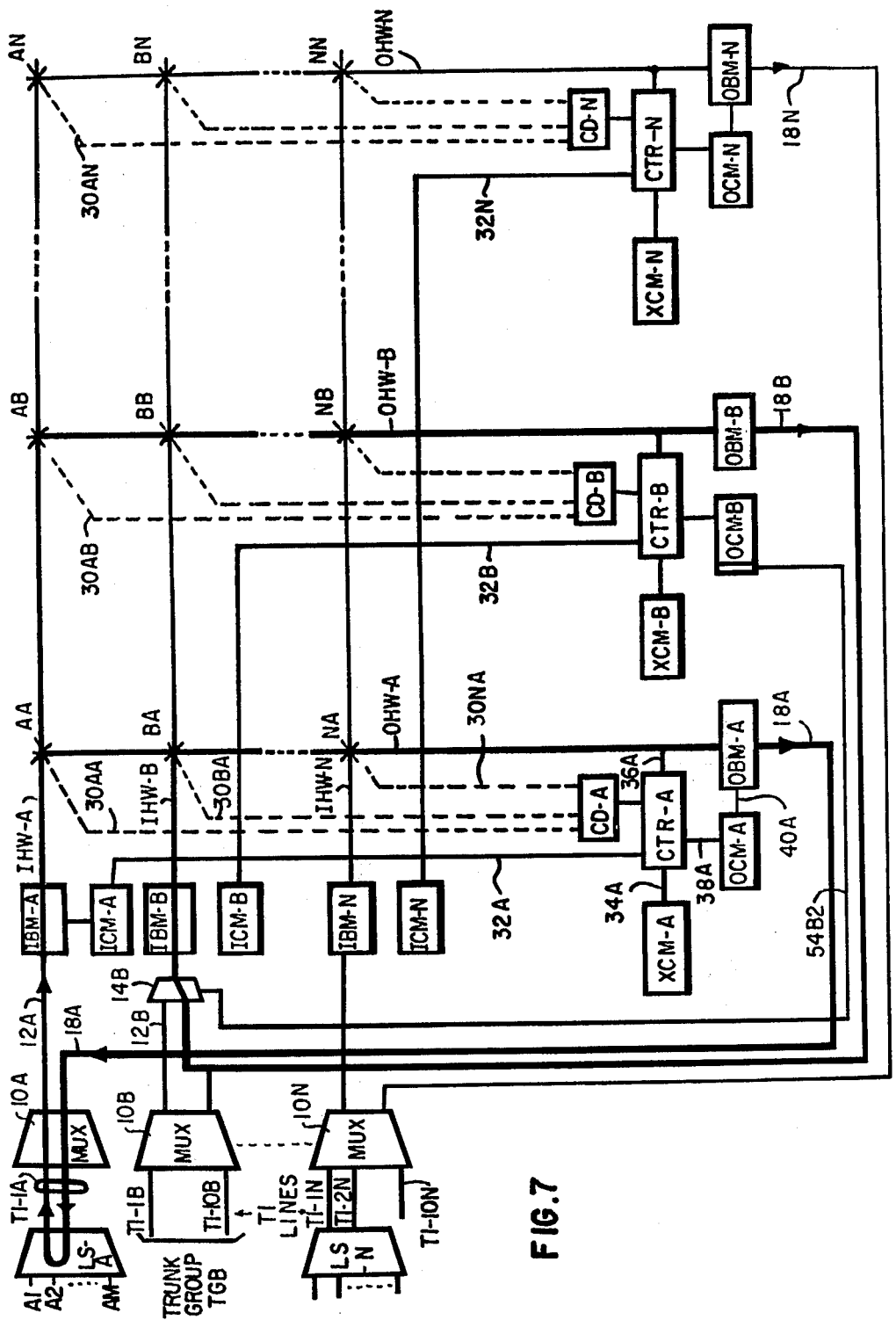

The continuity test can be extended to include the line switch LS-A and line circuit (not shown) as shown in FIG. 7. The example is between a subscriber line A1 of switch group A and a channel of trunk line T1-1B connected to switch group B. The heavy line indicates the continuity test path. The closed loop shown in the line switch LS-A can be completed for continuity words in two ways. One way only checks the T1 line T1-1A while the other also checks the line circuit. Note that in FIG. 7, the two pairs of the T1 line T1-1A are shown separately, and the other T1 lines to the multiplex 10A are not shown.

During the processing of calls or testing, various commands are sent to the line switches from the controllers and processor.

For the call shown in FIG. 7, commands to line switch LS-A can be sent by inserting them into the buffer memory OBM-A via controller CTR-A. Prior to testing of the path, the marker functions have been performed to set up the path by placing information into appropriate locations of memories IBM-A, ICM-A, XCM-B, OBM-A, OCM-B, IBM-B, ICM-B XCM-A, OBM-A and OCM-A.

The commands to line switch LS-A can then be inserted into the selected location of memory OBM-A. The continuity test words may be inserted into the path at any of the buffer memories involved.

The addition of two commands, one to set the continuity check and one to clear the continuity check permit a more comprehensive check of the line circuit. The set command causes the input to the line circuit to be fed back to the output of the line circuit. In order to assume that the continuity word does pass through the line circuit is complemented. The controller CTR-A then detects the complemented continuity word on alternate cycles through the path.

The trunk is treated in the same manner as shown in FIGS. 1 and 2, using the special multiplex circuit 14B.

Note that in switching groups, serving only local lines, the special continuity test hardware, including the multiplex circuits such as circuit 14A (FIG. 1) are not necessary with this method of implementing the path continuity test. However, if trunks are present in a switching group, and the method shown is used with these trunks, then the two-input multiplexers, such as multiplexer 14B and the outgoing control memory bit (lead 54B2) are available anyway.

CONCLUSION

Apparatus and methods for continuity path testing in a switching network with time division multiplexing has been described. The hardware is minimal, is added to each switch group, and requires no special interconnect between switch groups other than that already present. The hardware can be reduced with a suitable controller/buffer memory interface. A method of extending the test back to line switch and line circuit is also presented.

It should be noted that the invention described herein has been illustrated with reference to a particular embodiment. It is to be understood that many details used to facilitate the descriptions of such a particular embodiment are chosen for convenience only and without limitations on the scope of the invention. Many other embodiments may be devised by those skilled in the art without departing from the scope and spirit of the invention. For example, it would be obvious to one of ordinary skill in the art, in light of the disclosure herein, to loop back at any point between an input buffer memory and a line switch, i.e., looping all the way back to the line switch as in the alternative embodiment set out hereinbefore is not required. Accordingly, the invention is intended to be limited only by the scope and spirit of the appended claims.

What is claimed is:

1. Apparatus for testing path continuity through a time-space-time switching network of a communication switching system, in which paths through said switching network use time slots of time division multiplex recurring frames;
    said apparatus comprising means to insert a continuity word into a path being tested, said path being the actual call path to be placed into service, means to couple output and input points of said path being tested to form a continuously circulating loop for said continuity word, comparison means having a first input coupled to input means to receive said continuity word independently of said path being tested, and a second input coupled to said path being tested, said comparison means being operative to supply a verify signal at an output responsive to the words received at said first and said second inputs being the same.

2. Apparatus as set forth in claim 1 wherein said time-space-time switching network further comprises input time slot interchangers including input buffer memories, output time slot interchangers including output buffer memories, and crosspoint means interconnecting said input and output buffer memories with selected time slots for each said path;
    said means to insert a continuity word comprises means to insert said continuity word into one input buffer memory used by said path being tested, and said second input of said comparison means is coupled to one output buffer memory of said path being tested.

3. Apparatus as set forth in claim 2, further including a continuity test multiplexer for each of said input time slots interchangers, each continuity test multiplexer have a first input for normal data, a second input for continuity testing, address means to selectively enable one of said inputs each time slot of each frame, and an output coupled to the input buffer memory of the associated input time slot interchanger;
    wherein said input time slot interchangers each include an input control memory, said output time slot interchangers each include an output access memory and an output control memory, said means to insert a continuity word comprises means to place said continuity word in the output access memory of one output time slot interchanger in the path being tested, said output access memory being read during one frame instead of said output buffer memory under control of said control memory, each output control memory incudes a continuity test bit position in each word store, with an output for the continuity test bit position coupled to said address means of an associated one of said continuity test multiplexers so that when the continuity test bit is set for an output time slot the first input of a said one of said continuity test multiplexers is disabled and the second input is enabled to couple the output word from the output access memory during said one frame, and thereafter from said output buffer memory into the input buffer memory.

4. Apparatus as set forth in claim 2, further including a continuity test multiplexer for each of said input time slot interchangers, each continuity test multiplexer have a first input for normal data, a second input for continuity testing, address means to selectively enable one of said inputs each time slot of each frame, and an output coupled to the input buffer memory of the associated input time slot interchanger;
    wherein said input and output time slot interchangers include respectively input and output control memories, each output control memory includes a continuity test bit position in each word store, with an output for the continuity test bit position coupled to said address means of an associated one of said continuity test multiplexers so that when the continuity test bit is set for an output time slot the first input of a said one of said continuity test multiplexers is disabled and the second input is enabled to couple the output word from the outer buffer memory into the input buffer memory.

5. Apparatus as set forth in claim 4, further including a continuity test circuit associated with each pair of input and output time slot interchangers, each continuity test circuit comprising a continuity test word register and said comparison means, with the output of the continuity test bit position of the associated output control memory coupled to enable said comparison means;
    control means having connections to said continuity test word register to place said continuity word therein, an enable lead from said control means coupled to said address means, each said continuity test multiplexer having a third input, said continuity test word register having an output coupled to said first input of said comparison means, and said means to insert a continuity word comprises a connection from said output of said continuity test word register to said third input of said associated continuity test multiplexer, said first and second inputs of said continuity test multiplexer being disabled and said third input enabled by a signal on said enable lead in conjunction with said continuity test bit during the input time slot of said path being tested for one frame to thereby insert the continuity word into said input buffer register.

6. Apparatus for testing path continuity through a time-space-time switching network of a communication switching system, which uses time division multiplexing in time slots of recurring frames for handling information signals comprising digitally coded words, said switching network having an input side and an output side, there being a plurality of channels, with each channel having an input appearance on said input side and an output appearance on said output side, paths being selectively established through said switching network, with each path comprising means to couple information signals from the input appearance of a first channel to the output appearance of a second channel and also from the input appearance of said second channel to the output appearance of said first channel during each of said recurring frames;

said apparatus comprising means to insert and continuously circulate a continuity word into one of said paths being tested, said paths being the actual call paths to be placed into service, at said input appearance of said first channel, means coupling said output appearance of said second channel to said input appearance of said second channel, means coupling the output appearance of said first channel to said input appearance of said first channel, comparison means having first and second inputs and an output, means to supply said continuity word to said first input independently of said path being tested, means coupling a predetermined point in said path being tested to said second input, said comparison means being operative to supply a verify signal at said output responsive to receiving identical words at said first and second inputs, so that said verify signal indicates continuity for the transmission of said information signals through said path being tested.

7. Apparatus as set forth in claim 6 wherein said time-space-time switching network is organized into groups, each group comprising an input time slot interchanger, an output time slot interchanger, a set of crosspoints coupling the input time slot interchangers of all of said groups to the output time slot interchanger, a controller, and a crosspoint control memory, said input time slot interchangers each comprising an input buffer memory and an input control memory, said output time slot interchangers each comprising an output buffer memory and an output control memory, multiplex means providing an input channel highway coupled to the input buffer memory and an output channel highway coupled from the output buffer memory individual to each group, said appearances of each of said channels comprising a channel time slot which occurs at the same time on said input and output channel highways of the same group;

said means to insert a continuity word comprises means to insert said continuity word into the location in the input buffer memory for one of said first and second channels of said path being tested and said second input of said comparison means is coupled to the output channel highway for one of said first and second channels during the channel time slot of the last said one channel.

8. Apparatus as set forth in claim 7, further including a continuity test multiplexer coupled between the input channel highway and input buffer memory of each group, each continuity test multiplexer having a first input coupled to said input channel highway, a second input coupled to the output channel highway for the group, address means to selectively enable one of its inputs during each channel time slot;

wherein each output control memory includes a continuity test bit position in each word store, with an output for the continuity test bit position coupled to said address means for the continuity test multiplexer of the same group so that when the continuity test bit is set for a channel time slot the first input of said continuity test multiplexer of the group is disabled and the second input thereof is enabled to couple the word in the channel on the output channel highway into the input buffer location for that channel.

9. Apparatus as set forth in claim 7, wherein said output time slot interchangers each further includes an output access memory coupled to the output channel highway of the corresponding group, and said means to insert a continuity word further comprises means to place said continuity word in the output access memory which is coupled to the output channel highway for said first channel, and means under control of the output control memory of that group to read the continuity word from said output access memory in said first channel time slot to the last said output channel highway for one frame, and in subsequent frames to read from the output buffer memory in said first channel time slot.

10. Apparatus as set forth in claim 8 wherein each of said groups includes a continuity test circuit comprising a continuity test word register and said comparison means, with the output of the continuity test bit position of the output control memory of the group coupled to enable said comparison means;

said controller of each group having connections to said continuity test word register to place said continuity word therein, an enable lead from said controller coupled to said address means, each said continuity test multiplexer having a third input, said continuity test word register having an output coupled to said first input of said comparison means, and said means to insert a continuity word comprises a connection from said output of said continuity test word register to said input of said continuity test multiplexer, said first and second inputs of said continuity test multiplexer being disabled and said third input enabled by a signal on said enable lead in conjunction with said continuity test bit during the channel time slot of said one of said first and second channels of said path being tested to thereby insert the continuity word into said location in the input buffer memory.

11. Apparatus as set forth in claim 7 wherein each of said groups includes means between said controller and said buffer and control memories to access any location of said memories to read and write words therein, and said means to insert a continuity word into the location in the input buffer memory for said one of said first and second channels of said path being tested comprises writing said continuity word into said location in the input buffer memory via said access interface, and said comparison means comprises means to read a word from a location being used for said path being tested in one of said buffer memories, and means in said controller to compare the continuity word as inserted with said word read.

12. Apparatus as set forth in claim 11 further including a continuity test multiplexer coupled between the input channel highway and input buffer memory of each group, each continuity test multiplexer having a first input coupled to said input channel highway, a second input coupled to the output channel highway for the group, address means to selectively enable one of its inputs during each channel time slot;

wherein each output control memory includes a continuity test bit position in each store, with an output for the continuity test bit position coupled to said address means for the continuity test multiplexer of the same group so that when the continuity test bit is set for a channel time slot the first input of said continuity test multiplexer of the group is disabled and the second input thereof is enabled to couple the word in the channel on the output channel highway into the input buffer location for that channel.

13. Apparatus as set forth in claim 11, wherein said communication switching system includes line switch means having a plurality of subscriber line terminals, and time division multiplex lines connecting said line switch means to said multiplex means, with time slots for said channels on said time division multiplex lines;

and said apparatus includes means to extend said path being tested to include at least one of said first and second channels on said time division multiplex lines and the line switch means connected thereto.

14. A method for testing path continuity through a time-space-time switching network of a communication switching system, in which paths through said switching network use time slots of time division multiplex recurring frames;

said method comprising the steps of inserting a continuity word into a path being tested, said path being the actual call path to be placed into service, continuously circulating said continuity word through said path being tested, taking a word from said path being tested and comparing the last said word with said continuity word, and verifying continuity of the path being tested if the result of said comparing step indicates identity of the words compared.

15. A method as set forth in claim 14, wherein said time-space-time switching network further comprises input time slot interchangers including input buffer memories, output time slot interchangers including output buffer memories, and crosspoint means interconnecting said input and output buffer memories with selected time slots for each said path:

said step of inserting a continuity word comprises inserting said continuity word into one input buffer memory used by said path being tested.

16. A method for testing path continuity through a time-space-time switching network of a communication switching system, which uses time division multiplexing in time slots of recurring frames for handling information signals comprising digitally coded words, said switching network having an input side and an output side, there being a plurality of channels, with each channel having an input appearance on said input side and an output appearance on said output side, paths being selectively established through said switching network, with each path comprising means to couple information signals from the input appearance of a first channel to the output appearance of a second channel and also from the input appearance of said second channel to the output of said first channel during each of said recurring frames;

said method comprising the steps of inserting a continuously circulating continuity word into one of said paths being tested, said paths being the actual call paths to be placed into service, at said input appearance of said first channel, coupling said output appearance of said second channel to said input appearance of said second channel, coupling the output appearance of said first channel to said input appearance of said first channel, comparing said continuity word with a word from a predetermined point in said path being tested to supply a verify signal responsive to the compared words being identical, so that said verify signal indicates continuity for the transmission of said information signals through said path being tested.

17. A method as set forth in claim 16 wherein said time-space-time switching network is organized into groups, each group comprising an input time slot interchanger, an output time slot interchanger, a set of crosspoints coupling the input time slot interchangers of all of said groups to the output time slot interchanger, a controller, and a crosspoint control memory, said input time slot interchangers each comprising an input buffer memory and an input control memory, said output time slot interchangers each comprising an output buffer memory and an output control memory, multiplex means providing an input channel highway coupled to the input buffer memory and an output channel highway coupled from the output buffer memory individual to each group, said appearances of each of said channels comprising a channel time slot which occurs at the same time on said input and output channel highways of the same group;

said step of inserting a continuity word comprises inserting said continuity word into the location in the input buffer memory for one of said first and second channels of said path being tested, coupling the output channel highway for one of said first and second channels during the channel time slot of the last said one channel as said predetermined point for said step of comparing.

18. A method as set forth in claim 17 wherein each of said groups includes an access interface between said controller and said buffer and control memories to access any location of said memories to read and write words therein, and said step of inserting a continuity word into the location in the input buffer memory for said one of said first and second channels of said path being tested comprises writing said continuity word into said location in the input buffer memory via said access interface, and reading a word from a location being used for said path being tested in one of said buffer memories for said step of comparing.

19. Apparatus as set forth in claim 18, wherein said communication switching system includes line switch means having a plurality of subscriber line terminals, and time division multiplex lines connecting said line switch means to said multiplex means, with outgoing and incoming time slots for each said channel on said time division multiplex lines;

and said step of coupling the output appearance of said first channel to the input appearance of said first channel includes extending said path being tested to include said first channel on said time division multiplex lines and the line switch means connected thereto and coupling said outgoing to said incoming time slot at said line switch.

20. Apparatus for testing path continuity through a time-space-time switching network of a communication switching system, in which paths through said switching network use time slots of time division multiplex recurring frames;

said apparatus comprising means to insert a continuity word into a path being tested, said path being the actual call path to be placed into service, means to couple output and input points of said path being tested to form a circulating loop for said continuity word, comparison means having a first input coupled to input means to receive said continuity word independently of said path being tested, and a second input coupled to said path being tested, said comparison means being operative to supply a verify signal at an output responsive to the words received at said first and said second inputs being the same.

21. Apparatus for testing path continuity through a time-space-time switching network of a communication switching system, which uses time division multiplexing in time slots of recurring frames for handling information signals comprising digitally coded words, said switching network having an input side and an output side, there being a plurality of channels, with each channel having an input appearance on said input side and an output appearance on said output side, paths being selectively established through said switching network, with each path comprising means to couple information signals from the input appearance of a first channel to the output appearance of a second channel and also from the input appearance of said second channel to the output appearance of said first channel during each of said recurring frames;

said apparatus comprising means to insert and circulate a continuity word into one of said paths being tested, said paths being the actual call paths to be placed into service, at said input appearance of said first channel, means coupling said output appearance of said second channel to said input appearance of said second channel, means coupling the output appearance of said first channel to said input appearance of said first channel, comparison means having first and second inputs and an output, means to supply said continuity word to said first input independently of said path being tested, means coupling a predetermined point in said path being tested to said second input, said comparison means being operative to supply a verify signal at said output responsive to receiving identical words at said first and second inputs, so that said verify signal indicates continuity for the transmission of said information signals through said path being tested.

22. A method for testing path continuity through a time-space-time switching network of a communication switching system, in which paths through said switching network use time slots of time division multiplex recurring frames;

said method comprising the steps of inserting a continuity word into a path being tested, said path being the actual call path to be placed into service, circulating said continuity word through said path being tested, taking a word from said path being tested and comparing the last said word with said continuity word, and verifying continuity of the path being tested if the result of said comparing step indicates identity of the words compared.

23. A method for testing path continuity through a time-space-time switching network of a communication switching system, which uses time division multiplexing in time slots of recurring frames for handling information signals comprising digitally coded words, said switching network having an input side and an output side, there being a plurality of channels, with each channel having an input appearance on said input side and an output appearance on said output side, paths being selectively established through said switching network, with each path comprising means to couple information signals from the input appearance of a first channel to the output appearance of a second channel and also from the input appearance of said second channel to the output of said first channel during each of said recurring frames;

said method comprising the steps of inserting a circulating continuity word into one of said paths being tested, said paths being the actual call paths to be placed into service, at said input appearance of said first channel, coupling said output appearance of said second channel to said input appearance of said second channel, coupling the output appearance of said first channel to said input appearance of said first channel, comparing said continuity word with a word from a predetermined point in said path being tested to supply a verify signal responsive to the compared words being identical, so that said verify signal indicates continuity for the transmission of said information signals through said path being tested.

* * * * *

UNITED STATES PATENT OFFICE
CERTIFICATE OF CORRECTION

Patent No. 4,064,369            Dated December 20, 1977

Inventor(s) Frank E. Battocletti

It is certified that error appears in the above-identified patent and that said Letters Patent are hereby corrected as shown below:

Column 11, line 57, "slots" should be --slot--;

Column 16, line 43, "Apparatus" should be --A method--;

Column 15, line 56, after "output" insert --appearance--;

Column 18, line 27, after "output" insert --appearance--.

Signed and Sealed this

Eighteenth Day of July 1978

[SEAL]

Attest:

RUTH C. MASON
*Attesting Officer*

DONALD W. BANNER
*Commissioner of Patents and Trademarks*